Oct. 5, 1971    K. P. LOPATA    3,610,000

SEAL MEANS

Filed July 29, 1970

KARL PETER LOPATA
INVENTOR.

BY John L Munday
HIS ATTORNEY

United States Patent Office 3,610,000
Patented Oct. 5, 1971

3,610,000
SEAL MEANS
Karl Peter Lopata, Krefeld-Gartenstadt, Germany, assignor to Joh. Kleinewefers Sohne, Krefeld, Germany
Filed July 29, 1970, Ser. No. 59,237
Claims priority, application Germany, July 29, 1969,
P 19 38 406.6
Int. Cl. D06c 1/10
U.S. Cl. 68—5 E
8 Claims

ABSTRACT OF THE DISCLOSURE

An improvement for sealing devices for continuous web processing tanks which have a slot for passage of the web in and out of the tank, with the slots including a pair of membrane foil means positioned about the slot so that the web passes between the membrane means, the improvement comprising a spring means fixedly mounted at one end on the means forming the slot and positioned to contact one of the membrane foil means under spring compression at a point urging that one membrane means towards the other means.

BACKGROUND OF THE INVENTION

Figure 1:
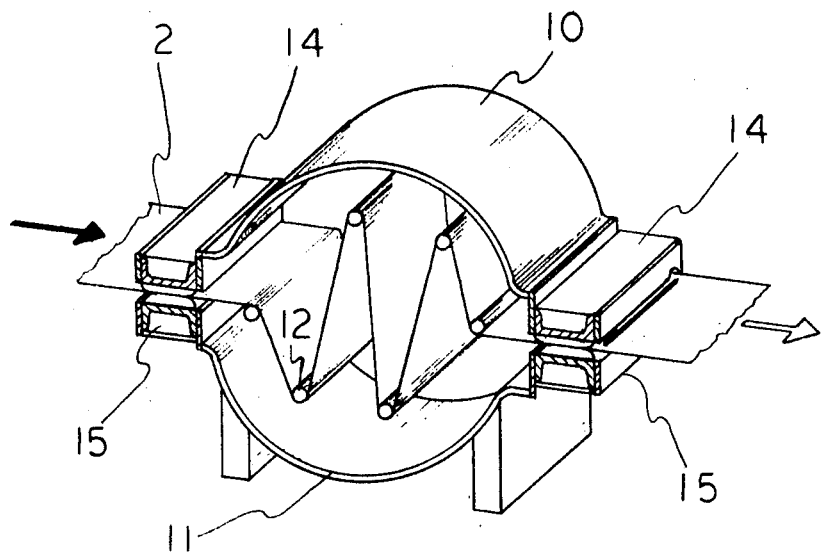

The present invention relates to an improved lip seal with a continuous transfer of textiles and other webs into and out of treatment tanks which may or may not be under a pressure different than atmospheric.

Tanks in which material webs are treated under continuous passage, such as in steaming, bleaching, washing or dewatering processes, must be sealed at the infeed and discharge sides of the web when the tanks are operated under a vacuum or pressure in order to maintain conditions within the tank at treatment values. A difficulty is incurred when the problem of adequately sealing the interior of the tank against the web is balanced against the problem of contacting the web material passing through the seal without damaging the web.

It has been known in the prior art to use a pair of rolls through which the web passes, but this method of sealing requires very intricate and expensive seals on the ends of the rolls and oftentimes is inadequate in maintaining the pressure interior of the tank. A more generally accepted method includes the use of a pair of membrane foil means positioned about a slot through which the web passes so that the web passes between the membrane means. The membrane foil means consist of an inflatable slidable material and the foils are firmly clamped in at the ends so that no difficulty in maintaining pressure conditions is incurred. Between the slot member mounting the membrane foil means and the foil means itself is a chamber which may be loaded with a gas or liquid to direct the membranes against each other and maintain the proper nip pressure, so that the web may pass between the member means under sufficient tension to adequately seal the tank from the outside atmosphere without damage to the web itself.

In using devices containing these membrane foil means, one difficulty arises when one side of the seal is exposed to a higher pressure. In the case of a processing tank placed under vacuum, the outer side of the seal is exposed to atmospheric pressure and conversely where the tank is operated at a higher than atmospheric pressure, the inner side of the seal is effected. These membrane foil means are deformed from the side exposed to the higher pressure, and such deformation oftentimes is sufficient to destroy the sealing effect. In addition, sometimes the deformation causes damage to the web passing through the seal means.

Accordingly, it is an object of this invention to provide a means for use in the membrane foil means type sealing devices to obviate a desirable deformation due to variances in pressure between the atmosphere and the inside of the tank.

Another object of this invention is to provide an improved method for controlling the load placed on the membrane foil members.

THE INVENTION

It has now been discovered that the above and other objects of the present invention may be accomplished in the following manner. Specifically, an improvement has been found which comprises the use of a spring means fixedly mounted at one end on the means forming the slot and positioned to contact one of the membrane foil means under spring compression at a point which urges the membrane foil means towards the other membrane foil means. Ideally, a pair of spring means are employed, one for each of the membrane foil means. In a preferred embodiment, the spring means is a leaf spring means and preferably the leaf spring means is mounted on the means forming a slot at the side of higher pressure, whether the tank is normally operated at less than atmospheric pressure or above atmospheric pressure. In other words, if the tank is normally operated at a partial vacuum, the leaf spring or other spring means would be mounted near the side closest to atmospheric pressure. Likewise, if the tank normally operates at a greater than atmospheric pressure, the spring means would be mounted on the means forming the slot at the side closest to the interior of the tank.

Another preferred embodiment of the present invention is use of a fluid inflatable cushion means supported by the means forming a slot and positioned to contact the spring means to further force the spring means against the membrane foil means as the fluid inflatable cushion means is inflated.

In the drawings

Figure 2:
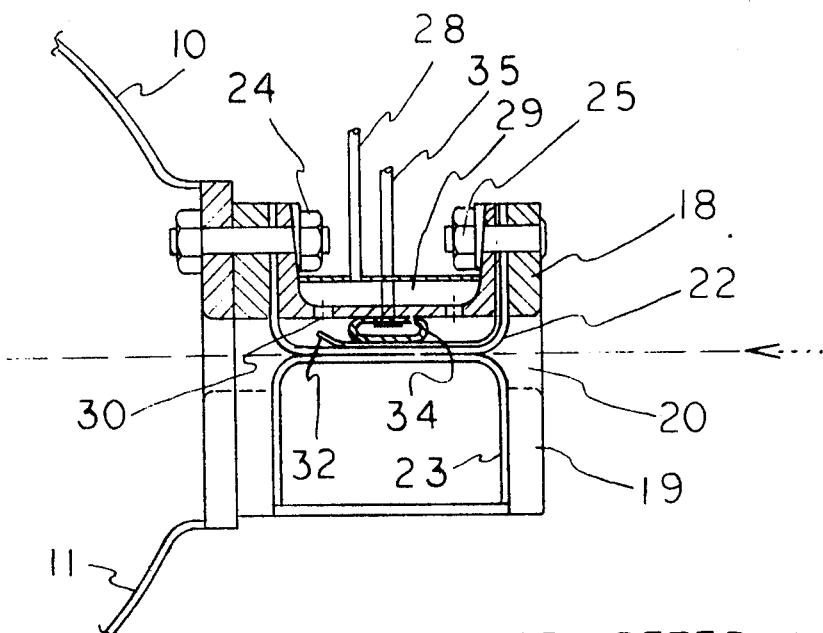

For a more complete understanding of the present invention, along with the various embodiments, reference is hereby made to the drawings, in which:

FIG. 1 represents a schematic perspective view; and
FIG. 2 represents a partially sectioned view of one sealing device of the present invention.

As shown in FIG. 1, a web 2 is passing through a tank comprising a top portion 10 and a bottom portion 11 in the direction shown by the arrows. Rollers 12 are employed to guide the web 2 through the device. Because it may be desirable to operate the tank at a pressure greater than or less than atmospheric pressure, sealing means 14 and 15 are provided to permit passage of the web 2 into the interior of the tank without loss or gain of pressure within the tank.

As shown in FIG. 2, the upper portion 10 and the lower portion 11 of the tank portions are provided with sealing means.

A slot 20 is provided for passage of the web material into or out of the tank. A means forming a slot for passage of the web into or out of the tank is provided by attaching a stationary member 18 to the upper portion of the tank 10 and a stationary member 19 to the lower portion of the tank 11. Thus the passageway 20 is defined. Membrane foil means 22 and 23 are mounted to the members 18 and 19 respectively to create a seal through which the web passes. Typically, the membrane foil means 22 is mounted to the frame 18 by bolts 25 and 26. The membrane foil means may be urged against one another typically by a source of pressure brought to bear on the interior side of the membrane foil means, such as by pressure in chamber 29 caused by introduction of fluid or gas therein through line 28. Holes 30 are provided to permit the pressure generating fluid to bear against the membrane 22.

As shown in FIG. 2, the invention herein described includes a spring means 32 fixedly mounted on the means forming a slot 18. The spring means 32 is positioned to contact one of the membrane foil means 22 under spring compression so as to urge the membrane foil means 22 towards the other membrane foil means 23. This spring means 32, which in the present embodiment is shown as a leaf spring, acts to maintain the membrane foil means in its operating position. As shown in FIG. 2, the tank itself is operating at a pressure less than the outside pressure, and for that reason, the spring means 32 is mounted on the side nearest the atmospheric pressure (by bolt 25) so that deformation of the membrane foil means 22 by pressure outside of the tank is substantially reduced or eliminated.

Under circumstances when additional or variable control of the pressure exerted by the spring means 32 on the membrane foil means 22 is desired, a preferred embodiment may be employed wherein a fluid inflatable cushion means 34 is urged against the spring means. Fluid, whether pneumatic or hydraulic may be introduced through pipe 35 to expand the fluid inflatable cushion means 34 as desired to vary the pressure on the membrane foil means 22.

Having thus described the invention, what is claimed is:

1. In a sealing device for continuous web processing tanks, including means forming a slot for passage of said web and a pair of membrane foil means positioned about said slot whereby said web passes between said membrane means, the improvement which comprises:
   a spring means fixedly mounted at one end on said means forming a slot and positioned to contact one of said membrane foil means under spring compression to urge said one membrane foil means towards the other membrane foil means.

2. The device of claim 1 which further includes a second spring means fixedly mounted at one end on said means forming a slot and positioned to contact the other of said membrane foil means under spring compression to urge said other membrane foil means towards the one membrane foil means.

3. The device of claim 1 wherein said spring means is a leaf spring means.

4. The device of claim 3 wherein said leaf spring means is mounted on said means forming a slot at the side of said slot exposed to the atmosphere when said tank is operated at reduced pressure.

5. The device of claim 3 wherein said leaf spring means is mounted on said means forming a slot at the side of said slot closest to the interior of said tank when said tank is operated at a pressure greater than atmospheric pressure.

6. The device of claim 3 which further includes fluid inflatable cushion means supported by said means forming a slot and positioned to contact said spring means to force said spring means against said membrane foil means under increasing inflation of said cushion means.

7. The device of claim 6 wherein said fluid inflatable cushion means is pneumatically inflatable.

8. The device of claim 6 wherein said fluid inflatable cushion means is hydraulically inflatable.

References Cited

UNITED STATES PATENTS

| | | | |
|---|---|---|---|
| 2,606,046 | 8/1952 | Bonner et al. | 68—5 EX |
| 3,137,151 | 6/1964 | Yoshiike | 68—5 E |
| 3,343,379 | 9/1967 | Duis et al. | 68—5 E |
| 3,421,345 | 1/1969 | Schiffer et al. | 68—5 E |

FOREIGN PATENTS

| | | | |
|---|---|---|---|
| 15,429 | 9/1962 | Japan | 68—5 E |

WILLIAM I. PRICE, Primary Examiner

U.S. Cl. X.R.

34—242